Figure 1:
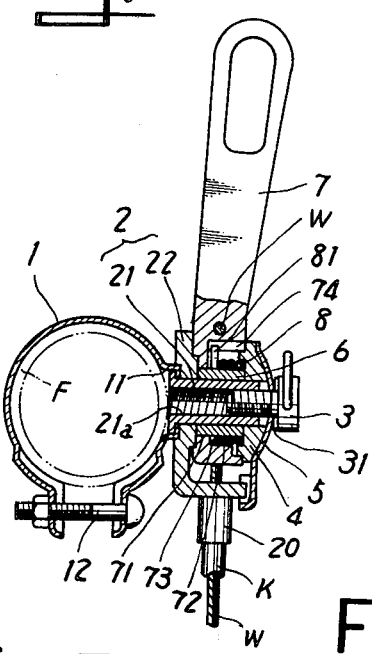

United States Patent [19]

Nagano

[11] 4,196,643
[45] Apr. 8, 1980

[54] OPERATING LEVER FOR A BICYCLE DERAILLEUR

[75] Inventor: Masashi Nagano, Sakai, Japan

[73] Assignee: Shimano Industrial Company Limited, Osaka, Japan

[21] Appl. No.: 886,643

[22] Filed: Mar. 15, 1978

[30] Foreign Application Priority Data

Mar. 29, 1977 [JP] Japan .............................. 52-39104[U]

[51] Int. Cl.² .............................................. G05G 5/16
[52] U.S. Cl. .......................................... 74/531; 74/489
[58] Field of Search ................................. 74/489, 531

[56] References Cited

U.S. PATENT DOCUMENTS

| 823,971 | 6/1906 | Remondy | 74/531 X |
| 3,886,806 | 6/1975 | Nagano | 74/531 X |
| 3,924,487 | 12/1975 | Huret et al. | 74/531 X |
| 3,943,794 | 3/1976 | Shimada | 74/531 X |

Primary Examiner—Allan D. Herrmann
Attorney, Agent, or Firm—Stevens, Davis, Miller & Mosher

[57] ABSTRACT

An operating lever assembly for a bicycle derailleur has a rotor having a rotational resistance greater than the force of a return spring at the derailleur and a lever body freely rotatable, and is provided with a gap at a portion where the rotor is coupled to a lever body, within which gap the lever body is allowed to be freely rotatable, so that the lever body is, when turned or rotated against the return spring force, capable of being returned a certain extent by the force of the derailleur return spring.

4 Claims, 5 Drawing Figures

OPERATING LEVER FOR A BICYCLE DERAILLEUR

This invention relates to an operating lever assembly for a bicycle derailleur, and more particularly to an operating lever which moves a control wire to reciprocally shift a movable member of the derailleur to thereby switch a driving chain to a selected sprocket of multi-stage front sprocket assembly or multi-stage rear sprocket assembly.

Conventionally, this kind of operating lever retains at its lever body a terminal of the control wire and is freely rotatably supported to a fixed member which is mounted to the bicycle frame through a mounting band. The lever body is urged axially of the fixed member toward the base thereof to produce a desired rotational resistance greater than the force of a return spring at the derailleur, and is operated to pull the control wire or allow it to be returned by the spring force for changing the bicycle speed, and is maintained at a controlled position through the rotational resistance.

Sprockets of multi-stage freewheels have a differing number of teeth, for example, a minimum of 14 to a maximum of 32, thereby enabling a cyclist to easily propel the bicyle even on an upward slope. The derailleur for switching the chain to a selected one of sprockets comprises a supporting member mounted to the bicycle frame, a movable member carrying a yoke which has pulleys and swings through a pivot, a pair of linkage members connected with fixing member in relation of swinging therewith, and a return spring unidirectionally urging the movable member. The derailleur is mounted axially outwardly of the high speed sprocket having the minimum number of teeth so that the control wire is pulled to shift the movable member from the high speed sprocket to the low speed sprocket having the maximum number of teeth against the return spring force, returned or by means of the restoring force of the spring, thereby switching the chain to a selected one of sprockets. However, the movable member, which is shifted through the linkage members, moves axially of the sprockets in a circular arc with respect to the supporting member. As a result, a pivot for the yoke of the movable member tends to approach the tips of teeth of the low speed sprocket when shifted from the high speed to the low speed sprocket while leaving the tips of the high speed sprocket when shifted reversely. Hence, when set to be shifted on the basis of an interval between the pivot and tips of teeth of the low speed sprocket, the movable member should be shifted at a larger interval between the pivot and the teeth of the high speed sprocket than the internal between the pivot and the low speed sprocket. Consequently, the yoke is conventionally slightly over-shifted from the center line of the thickness of the sprocket, thereby properly changing the speed even at the aforesaid larger interval.

The operating lever, however, is kept in its turned position by the aforesaid rotational resistance, whereby when the yoke is over-shifted the chain is inclined thicknesswise with respect to the sprocket. Hence, the problem occurs that the chain is, when switched, contacted with the lateral side of an adjacent sprocket to thereby generate noise and, even after the cyclist releases the lever, the lateral sides of teeth of the sprocket in mesh with the chain are in contact with the inner sides of inner links of chain which further generates noise.

The invention has been designed to overcome the aforesaid problem. Accordingly, an object of the invention is to provide an operating lever which reliably switches the chain to a selected one of a plurality of sprockets with less noise, enables a cyclist to change speed with a positive feel and which further eliminates noise after the speed is changed.

The operating lever of the invention is characterized in that the lever body, which supports a terminal of the control wire, is rotatably supported to a fixed member mounted to the bicycle frame, to which fixed member is supported a frictional rotor urged toward the fixed member to be rotatable under the desired rotational resistance, the rotor and lever body being connected in association with each other, and a gap is provided at the connection of the lever body with the roto to make the lever body only freely rotatable, whereby the lever body is reversely rotated a fixed extent with respect to the lever rotation required to pull the control wire for changing the speed.

Figure 2:
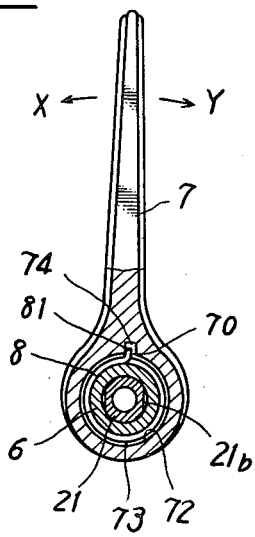
Figure 3:
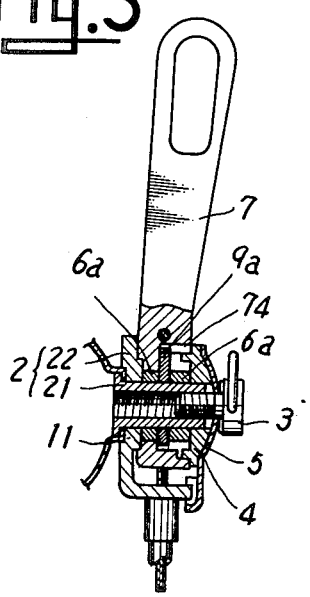
Figure 4:
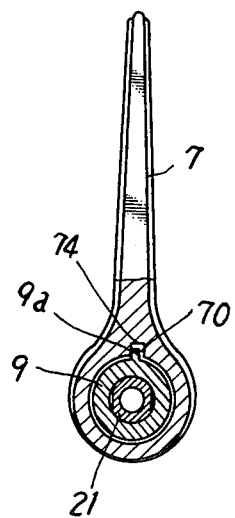
Figure 5:
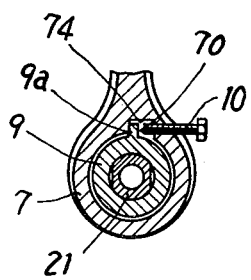

These and other objects and advantages of the invention will be more apparent from the following description in accordance with the accompanying drawings, in which FIG. 1 is a longitudinally sectional front view of a typical embodiment of the invention, FIG. 2 is a longitudinally sectional side view thereof, FIG. 3 is a longitudinally sectional front view of a modified embodiment of the invention, FIG. 4 is a longitudinally sectional side view thereof, and FIG. 5 is a sectional view of another modified embodiment, showing its principal portion.

In the drawings, the reference numeral 1 designates a tightening band mounted to a vertical tube F of its bicycle frame. The band 1 has at the intermediate portion a square support 11 to which a fixed member 2 is secured.

The fixed member 2 comprises a tubular shaft 21 and a fixed plate 21. The shaft 21 is inserted at its one end into a bore at the support 11 to be non-rotatably supported thereto. The fixed plate 22 is inserted onto the base of shaft 21 to be supported onto the outer surface of the support 11.

A central bore of the shaft 21 is provided with a screw thread 21a to the foremost end of which an adjusting screw 3 is screwed. At the outer periphery of the shaft 21 are provided two opposite flat portions 21b extending lengthwise of the shaft 21. At the foremost end of each of the flat portions 21b is supported a push plate 4 which is axially movable only, the plate 4 having at its center an insertion bore fitted onto the outer periphery of the shaft 21. A cover 5 is inserted between the plate 4 and the head of adjusting screw 3.

A cylindrical frictional rotor 6 is rotatably supported to the shaft 21. The rotor 6 is inserted between the fixed plate 22 and the push plate 4 and urged toward the fixed plate 22 by turning the adjusting screw 3, thereby being subjected to a predetermined rotational resistance.

The rotational resistance is made greater than the return spring (not shown) force at the derailleur so as to hold a lever body 7 to be hereinafter described at a desired position after being operated.

The lever body 7, which is rotatably supported to the rotor 6, has a boss at the center of which are formed a through hole 71 and a round recess 72 adjacent thereto, opening at one side and being larger in diameter than the hole 71. Between the inner periphery of the recess 72 and the outer periphery of the rotor 6 is provided an annular space 73. A retaining groove 74 is, as shown in FIG. 2, formed at the inner periphery of the recess 72 within the space 73. An end of control wire W is retained by the lever body 7. The lever body 7 may, rather than being supported to the shaft 21 through the rotor 6, be rotatably supported to a tubular support (not shown) formed at one side of the fixed plate 22.

A coiled clutch spring 8 connects the lever body 7 to the rotor 6 in association therewith. The spring 8 is wound onto the outer periphery of the rotor 6 and has one end not retained to the rotor 6 but slidably contacting therewith and the other end bent radially outwardly to be retained by the groove 74 at the recess 72 of the lever body 7.

The clutch spring 8 tends to expand from the frictional rotor 6 when the lever body 7 is turned to pull the control wire W, i.e., to restore the return spring in the direction as shown by the arrow X in FIG. 2, and is contracted to tighten about the rotor 6 when the lever body 7 is released from a cyclist's hand, so that the lever body 7 is coupled with the rotor 6. Thus, the rotational resistance applied to the rotor 6 prevents the lever body 7 from reversely rotating even when the return spring force is exerted on the lever body 7 through the control wire W, thus keeping the lever body 7 in position. The clutch spring 8 tends to tighten about the rotor 6 more strongly when the lever body 7 is turned in the reverse direction, i.e., against the return spring (as shown by the arrow Y in FIG. 2), whereby the lever body 7 is coupled with the rotor 6 to be rotated together therewith for changing the speed and is kept in its turned position through the rotational resistance as earlier described.

Hence, the lever body 7 is always kept in its turned position after it is moved to change the bicycle speed through the control wire W.

In the above described construction of the operating lever of the invention, the groove 74, which is located at the associating portion between the lever body 7 and rotor 6 and insertably engaged with the one bent end 81 of clutch spring 8, is larger to a certain extent in circumferential width than the thickness of the bent end 81 so as to form a gap 70 through which the lever body 7 only is freely movable, so that the lever body may, afer being operated against the return spring, reversely rotate a certain extent with respect to its initial rotation.

The extent of reverse rotation of the lever body 7 is made approximately equal to over-shifting of the yoke of the derailleur. When the lever body 7 is released after the speed change, the restoration of the return spring allows the lever body 7 to turn back freely to the exent set by the gap through the control wire W, thereby automatically eliminating the over-shift of the chain guide.

Accordingly, when the lever body 7 is turned to switch the chain to one of the sprockets for changing the bicycle speed, the yoke is over-shifted from the center line of thickness of the sprocket and then the lever is released to rotate back, whereby the chain guide returns to the proper position corresponding to the center line of the thickness of the sprocket so as to prevent the chain from being inclined with respect to the center line of the thickness of the sprocket.

In the aforesaid embodiment, the clutch spring 8 is used for connecting the rotor 6 with the lever body 7, but a connector 9 may be used, which is formed of a disc at the outer periphery of which an engaging projection 9a is provided. In this instance, the rotor 6 is divided at its intermediate portion into two rotors 6a and 6a between which the connector 9 is inserted. The connector 9 receives the same rotational resistance as applied to the rotor 6 and the projection 9a is insertably retained in the groove 74. Alternatively, the separate rotors 6a, 6a may be incorporated with the connector 9.

The extent of return of the lever body 7 is desirably adjustable by a screw 10 which is, as shown in FIG. 5, provided to enter the groove 74 through the lever body 7 so as to be screwed to adjust the width of gap 70.

Completing the description of the illustrated structures, the reference numeral 20 designates an outer sheath holder; K, the outer sheath for the control wire W; 31, a washer; and 12, a tightening screw.

As clearly understood from the aforesaid description, the operating lever of the invention is provided with a gap at the portion where the lever body and rotor are connectd in association with each other, in which gap the lever body only is freely rotatable, so that the lever body is, after being operated to pull the control wire against the return spring, made to reversely rotate to a certain extent with respect to the lever's operative movement. Hence, the chain guide of the derailleur, which is over-shifted to switch the chain reliably to a selected one of sprockets when the lever body is operated for changing the speed, also returns to a proper position corresponding to the selected sprocket when the lever body is released from the cyclist's hand due to the noted reverse rotation of lever 7, so that the driving chain may be prevented from being inclined with respect to the radial direction of sprocket and generating noise caused by contact with the lateral side thereof as conventionally occurs.

Furthermore, the lever body is quickly released just after the chain is meshed with the sprocket so as to generate less noise while providing the cyclist with a good feel of the speed changing process.

While the invention has been described with reference to particular embodiments thereof, those embodiments are merely exemplary, the invention being limited solely by the appended claims.

What is claimed is:

1. An operating lever assembly for controlling a derailleur for a bicycle, comprising:

a fixed member fixed to the bicycle frame, said fixed member having a shaft of a given length;

a rotor rotatably supported to said shaft of the fixed member, said rotor having a cylindrical portion fitted onto said shaft;

means for urging said rotor toward said fixed member so that said rotor may be applied with rotational resistance greater than the force of a return spring of the derailleur;

a lever body supported rotatably with respect to said fixed member, said lever body having fixed thereto a control wire for controlling the derailleur for changing the bicycle speed; and means for causing said lever body to engage with said rotor such that said lever body and rotor move in association with each other, said means for causing engagement including an engaging portion provided on one of said lever and rotor and means for coupling said engaging portion to the other of said lever and rotor, said engaging portion defining a gap in which said means for coupling is positioned to allow said lever body to be freely rotatable with respect to said rotor, whereby said lever body, when operated to pull said wire against the return spring at the derailleur, reversely rotates a fixed extent with respect to the rotation of the lever body required to change the bicycle speed.

2. The operating lever assembly for controlling the derailleur according to claim 1, wherein an engaging groove is provided at one of said rotor and the inner periphery of a through hole provided at a boss of said lever body and a projection engageable with said groove is provided at the other, said groove being larger in width than said projection, thereby enabling said lever body to reversely rotate a fixed extent.

3. The operating lever assembly for controlling the derailleur according to claim 2, wherein an engaging groove is provided at the inner periphery of said through hole at said boss of the lever body, a projection engageable with said engaging groove is provided at said rotor, and into said lever body is screwed an adjusting screw entering said engaging groove for abutting against said projection so that the gap between said engaging groove and projection may be made adjustable.

4. The operating lever assembly for controlling the derailleur according to claim 1, wherein said lever body includes a boss containing a through hole and a round recess in continuation thereof which is larger in diameter than said through hole, and said rotor is cylindrical to form an annular space between the inner periphery of said recess and the outer periphery of said rotor, said space accommodating therein a coiled clutch spring, said spring being wound onto the rotor in relation of being slidable with respect thereto and bent at one end axially outwardly thereof, said bent end engaging with the inner periphery of said recess at the lever body.

* * * * *